(12) United States Patent
Parish et al.

(10) Patent No.: US 8,387,146 B2
(45) Date of Patent: *Feb. 26, 2013

(54) SYSTEM AND METHOD FOR TRACKING COMPUTER VIRUSES

(75) Inventors: Sandy Parish, Mountain View, CA (US); Peter Goostree, Peoria, AZ (US)

(73) Assignee: McAfee, Inc., Santa Clara, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 13/047,484

(22) Filed: Mar. 14, 2011

(65) Prior Publication Data

US 2011/0214185 A1    Sep. 1, 2011

Related U.S. Application Data

(63) Continuation of application No. 11/854,445, filed on Sep. 12, 2007, now abandoned, which is a continuation of application No. 09/999,603, filed on Oct. 25, 2001, now Pat. No. 7,310,818.

(51) Int. Cl.
G06F 12/14 (2006.01)
G06F 11/30 (2006.01)
H04L 29/06 (2006.01)

(52) U.S. Cl. ............ 726/24; 726/22; 713/151; 713/152; 713/165; 713/188

(58) Field of Classification Search ............... 726/24, 726/22; 713/151, 152, 165, 188
See application file for complete search history.

(56) References Cited

U.S. PATENT DOCUMENTS

| | | | |
|---|---|---|---|
| 5,359,659 A | 10/1994 | Rosenthal | |
| 5,440,723 A | 8/1995 | Arnold et al. | |
| 5,511,163 A | 4/1996 | Lerche et al. | |
| 5,649,095 A | 7/1997 | Cozza | |
| 5,832,208 A | 11/1998 | Chen et al. | |
| 5,960,170 A | 9/1999 | Chen et al. | |
| 5,964,889 A | 10/1999 | Nachenberg | |
| 6,006,329 A | 12/1999 | Chi | |
| 6,029,256 A | 2/2000 | Kouznetsov | |
| 6,035,423 A | 3/2000 | Hodges et al. | |
| 6,067,410 A | 5/2000 | Nachenberg | |
| 6,088,804 A | 7/2000 | Hill et al. | |
| 6,269,447 B1 | 7/2001 | Maloney et al. | |
| 6,347,375 B1 | 2/2002 | Reinert et al. | |
| 6,611,925 B1 | 8/2003 | Spear | |
| 6,721,721 B1 | 4/2004 | Bates et al. | |
| 6,728,886 B1 | 4/2004 | Ji et al. | |

(Continued)

FOREIGN PATENT DOCUMENTS

| | | |
|---|---|---|
| WO | 9810342 | 3/1998 |
| WO | 0242879 | 5/2002 |

OTHER PUBLICATIONS

Office Action mail date Feb. 3, 2005 received in corresponding U.S. Appl. No. 09/999,603.

(Continued)

*Primary Examiner* — Aravind Moorthy
(74) *Attorney, Agent, or Firm* — Wong, Cabello, Lutsch, Rutherford & Brucculeri, LLP

(57) ABSTRACT

A method for collecting and distributing data on computer viruses identified on a plurality of computers during virus scanning includes receiving virus scan results from the plurality of computers and collecting and storing the virus scan results in a database. The results include the type of virus identified. The method further includes aggregating at scheduled intervals the virus scan results over a specified time period at a publisher server to create a virus database and replicating the virus database to a subscriber server. A virus report is created from the virus database upon receiving a request from a user computer at the subscriber server and sent to the user computer.

20 Claims, 14 Drawing Sheets

U.S. PATENT DOCUMENTS

| | | | |
|---|---|---|---|
| 6,735,700 | B1 | 5/2004 | Flint et al. |
| 6,785,732 | B1 | 8/2004 | Bates et al. |
| 6,785,818 | B1 | 8/2004 | Sobel et al. |
| 6,804,778 | B1 | 10/2004 | Levi et al. |
| 6,847,888 | B2 | 1/2005 | Fox et al. |
| 7,228,565 | B2 | 6/2007 | Wolff et al. |
| 7,310,818 | B1 | 12/2007 | Parish et al. |
| 7,363,657 | B2 | 4/2008 | Caccavale |
| 7,496,960 | B1 | 2/2009 | Chen et al. |
| 2002/0078131 | A1 | 6/2002 | Dowd et al. |
| 2002/0174358 | A1 | 11/2002 | Wolff et al. |
| 2003/0041238 | A1* | 2/2003 | French et al. ................ 713/153 |
| 2003/0070088 | A1* | 4/2003 | Gryaznov .................... 713/201 |
| 2005/0086526 | A1 | 4/2005 | Aguirre |
| 2009/0019388 | A1 | 1/2009 | Zhang et al. |

OTHER PUBLICATIONS

Office Action mail date Apr. 28, 2005 received in corresponding U.S. Appl. No. 09/999,603.

Office Action mail date Jun. 21, 2005 received in corresponding U.S. Appl. No. 09/999,603.

Office Action mail date Sep. 7, 2005 received in corresponding U.S. Appl. No. 09/999,603.

Office Action mail date Jan. 24, 2006 received in corresponding U.S. Appl. No. 09/999,603.

Office Action mail date Mar. 23, 2007 received in corresponding U.S. Appl. No. 09/999,603.

Notice of Allowance mail date Oct. 2, 2007 received for corresponding U.S. Appl. No. 09/999,603.

Fu et. al, Visualization and Analysis of Email Networks, 2007 IEEE, pp. 1-8.

Office Action mail date Sep. 8, 2009 received in corresponding U.S. Appl. No. 11/854,445.

Office Action mail date Feb. 24, 2010 received in corresponding U.S. Appl. No. 11/854,445.

"Trend World Virus Tracking Center" 6 pgs. http://wtc.trendmicro.com/wtc/. (Document cited in corresponding U.S. Appl. No. 09/999,603 and is not available.).

* cited by examiner

WORLDWIDE GRAND TOTALS - FILES

| PERIOD | INFECTED FILES | SCANNED FILES |
|---|---|---|
| Past 24 Hours | 81,641 | 320,367 |
| Past 7 Days | 771,418 | 4,130,856 |
| Past 30 Days | 3,804,627 | 16,210,486 |

FIG. 10

WORLDWIDE GRAND TOTALS - COMPUTERS

| PERIOD | INFECTED COMPUTERS | SCANNED COMPUTERS |
|---|---|---|
| Past 24 Hours | 6,532 | 24,560 |
| Past 7 Days | 48,832 | 170,921 |
| Past 30 Days | 196,960 | 734,789 |

FIG. 11

WORLDWIDE TOP TEN VIRUSES – PAST 24 HOURS

| VIRUS NAME | INFECTED FILES | SCANNED FILES |
|---|---|---|
| 1. LoveLetter | 41,125 | 1,514,234 |
| 2. Magistr | 10,165 | 33,245,455 |
| 3. Haptime | 6,831 | 390,504 |
| 4. SirCam | 4,190 | 21,322,450 |
| 5. Gorum.gen | 4,132 | 6,456,788 |
| 6. PornDial9 | 2,288 | 450,650 |
| 7. FunLove.gen | 1,379 | 5,456,712 |
| 8. SirCam.dat | 1,120 | 458,322 |
| 9. Hybris.gen | 856 | 5,432,678 |
| 10. Hai.worm | 724 | 321,456 |

FIG. 12

SYSTEM AND METHOD FOR TRACKING COMPUTER VIRUSES

CROSS REFERENCE TO RELATED APPLICATIONS

This application is a continuation application of continuation U.S. patent application Ser. No. 11/854,445, filed on Sep. 12, 2007, entitled "System and Method for Tracking Computer Viruses," which is a continuation of U.S. patent application Ser. No. 09/999,603 filed on Oct. 25, 2001, now U.S. Pat. No. 7,310,818 granted Dec. 18, 2007, entitled "System and Method for Tracking Computer Viruses," which are hereby incorporated by reference and to which priority is claimed.

BACKGROUND OF THE INVENTION

The present invention relates generally to computer viruses, and more particularly, to a system and method for tracking computer viruses.

A huge surge in computer viruses has occurred in the last decade. Computer viruses have gone from an academic curiosity to a persistent, worldwide problem. Today, viruses affect vast numbers of computers in locations throughout the world. A computer virus is generally a manmade destructive computer program or code that is loaded onto a computer system without the knowledge of the user. The computer virus is often a self-replicating program containing code that explicitly copies itself and can infect other programs by modifying them or their environment. Even a simple virus can be dangerous as the virus can quickly use a large portion of the available memory and possibly bring down the computer system.

Viruses can be written for, and spread on, virtually any computing platform. A virus can infect, or become resident in almost any software component, including an application, operating system, system boot code, or device driver. Computer viruses spread by attaching themselves to other programs (e.g., word processing or spreadsheet applications) or to a boot sector of a disk. When an infected file is activated or executed, or when the computer is started from an infected disk, the virus is also executed and attempts to infect other files. Since a virus is software code, it can be transmitted along with any legitimate software that enters the computer environment. Some viruses are capable of transmitting themselves across networks and bypassing security systems. For example, a virus can spread to files on a local area network (LAN) based file server, and from there to other client systems attached to the server. Similarly, systems that run programs from wide area network (WAN) file servers can become infected if the programs on the server are susceptible to infection. In the networked world of the Internet, viruses can rapidly spread.

The term virus generally refers to any destructible or harmful program or code that attempts to hide its possibly malicious function or tries to spread onto as many computers as possible. One common type of virus is a macro virus which is encoded as a macro embedded in a document. Many applications support macro languages which allow the user to embed a macro in a document and have the macro execute each time the document is opened. Once a computer system is infected with a macro virus, the virus can embed itself in all future documents created with the associated application.

Another common virus is a boot sector virus which replaces the computer system's master boot record with its own code. The boot sector virus is a small program executed each time a computer boots. The virus infects floppy disks and hard disks by inserting itself into the boot sector of the disk, which contains code that is executed during the system boot process. Since the master boot record executes every time the computer is started, the boot sector virus can be very dangerous to the integrity of the computer system. The boot sector virus typically enters the computer system through a floppy disk installed in the floppy drive when the computer system is started.

Another type of virus, which is often difficult to detect, is a polymorphic virus. This virus produces varied but operational copies of itself. Code within the virus includes an encryption routine to help the virus hide from detection, plus a decryption routine to restore the virus to its original state when it executes.

A Trojan horse is another type of virus which masquerades as a legitimate software program. The Trojan horse generally does not replicate. It waits until its trigger event occurs and then displays a message or destroys files or disks.

A computer worm is another type of virus that can replicate itself and use memory but cannot attach itself to other programs. The computer worm is a self-contained program, or set of programs, that is able to spread functional copies of itself or its segments to other computer systems, usually via network connections. Host computer worms are entirely contained in the computer they run on and use network connections only to copy themselves to other computers. Network worms consist of multiple parts (called "segments"), each running on different machines and using the network for several communication purposes.

Many anti-virus programs have become commercially available for protection against viruses. There are three main types of anti-virus software: activity monitors, integrity checkers, and scanners. Activity monitoring programs attempt to prevent infection before it happens by looking for virus type activity, such as attempts to reformat a disk. Integrity checkers compute a small checksum or hash value for files which are presumably uninfected, and later compare newly calculated values with the original ones to see if the files have been modified. These programs catch unknown viruses as well as known ones. Integrity checkers may be called to check entire disks or they may be resident, checking each program that is about to be executed.

Scanners are the most widely used type of anti-virus program. Virus scanners generally operate in batch mode, scanning all files on a system, hard disk, or floppy disk, when requested by the user, or at set intervals. They look for known viruses by searching disks and files for scan strings or patterns. A scanner may be designed to examine specified disks or files on demand, or it may be resident, examining each program that is about to be executed. Most scanning programs include an update feature that allows the anti-virus program to download profiles of new viruses from the Internet or network resources so that the program can check for new viruses soon after they are discovered. Most scanners also include virus removers which are operable to clean infected files. One example of an anti-virus scanner is McAfee's VSHIELD brand anti-virus scanner.

Conventional approaches to tracking computer viruses typically rely on samples submitted from computer users that have found a new virus on their computer. These reports typically fall off once a virus is reported in the media and on anti-virus web sites, since users no longer feel there is a need to report them. Virus researchers are therefore left to guess about the prevalence and commonality of a virus, basing their conclusions on anecdotal evidence and spot reports. Furthermore, these conventional systems do not typically provide up to date reports.

There is, therefore, a need for a system and method for tracking computer viruses over a wide area and providing up to date and reasonably reliable data.

SUMMARY OF THE INVENTION

A method and system for collecting and distributing data on computer viruses identified on a plurality of computers during virus scanning are disclosed.

A method of the present invention generally includes receiving virus scan results from a plurality of computers and collecting and storing the virus scan results in a database. The results include the type of virus identified. The method further includes aggregating at scheduled intervals the virus scan results over a specified time period at a publisher server to create a virus database and replicating the virus database to a subscriber server. A virus report is created from the virus database upon receiving a request from a user computer at the subscriber server and sent to the user computer.

A computer product for collecting and distributing data on computer viruses identified on a plurality of computers during virus scanning generally includes computer code that receives virus scan results from a plurality of computers and computer code that collects and stores the virus scan results in a database. The product further includes computer code that aggregates at scheduled intervals the virus scan results over a specified time period at a publisher server to create a virus database and computer code that replicates the virus database to a subscriber server. Computer code is also provided that creates a virus report upon receiving a request from a user at the subscriber server and sending the virus report to the user computer. The product also includes a computer readable medium that stores the computer codes.

In another aspect of the invention, a system for collecting and distributing data on computer viruses generally comprises a data collection server operable to communicate with a plurality of computers and collect virus scan results, and a database configured for storing at least temporarily the virus scan results. The system further includes a publisher server configured to aggregate at scheduled intervals the virus scan results over a specified time period to create a virus database and replicate the virus database. A subscriber server operable to receive the replicated virus database from the publisher server and create a virus report upon receiving a request from a user is also included.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

FIG. 10 is a table providing virus statistics based on the number of files scanned and infected.

FIG. 11 is a table providing virus statistics based on the number of computers scanned and infected.

FIG. 12 is a table providing information on the top ten viruses identified in a 24-hour period.

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The system and method of the present invention allow users to view data on viruses identified worldwide including, for example, specific viruses identified, number of files scanned for viruses, number of infected files found, number of computers scanned for viruses, and the number of infected computers found. Data is aggregated often (e.g., every twenty minutes) over different time periods (e.g., 24 hours, 7 days, 30 days). The data may be organized and reported by state (within the United States), by country, by continent, and worldwide, for example. The top ten viruses are also reported for different time periods and geographic locations. The present invention allows users to collect information on the prevalence, commonality, and locations of specific viruses. The examples below show the data presented in the form of a virus map, however, it is to be understood that the data may be presented in other formats (e.g., tables, graphs, charts), without departing from the scope of the invention.

Figure 1:
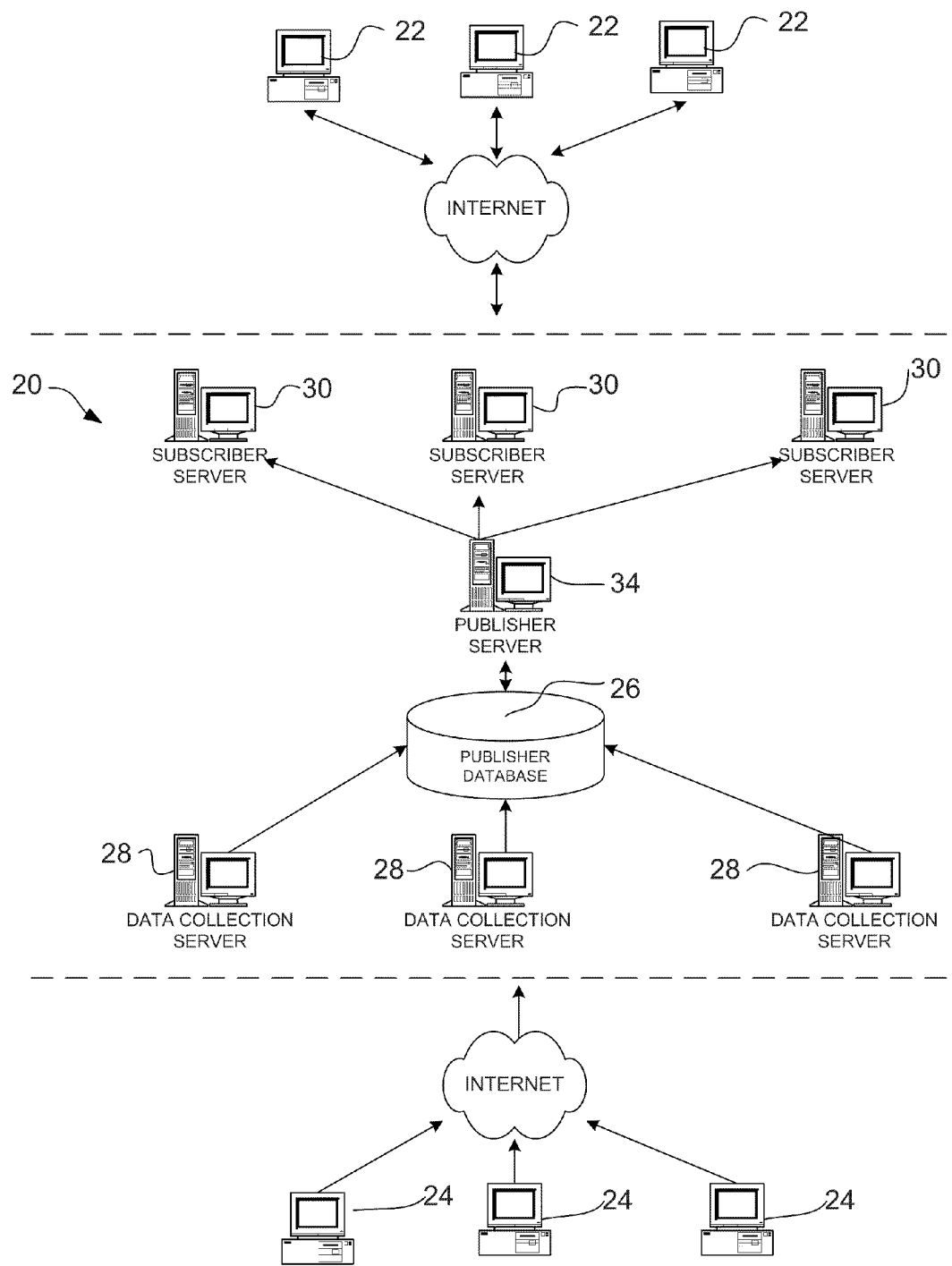
FIG. 1 is a block diagram illustrating a system of the present invention for tracking and reporting computer viruses identified on a plurality of computers.

Referring now to the drawings, and first to FIG. 1, a system of the present invention is shown and generally indicated at 20. The system is in communication with user computers 22, 24 through a network such as the Internet. The computer network may also be an intranet, a local area network (LAN) or any other type of network. Transmission media such as T1 and T3 lines, dial-up, DSL (Digital Subscriber Line), cable connections or a wireless connection may provide interconnections between the computers and network, for example.

In the example shown in FIG. 1, user computers 22 are used to access the virus map and user computers 24 are used to report viruses identified during virus scanning. It is to be understood that the same computers may be configured to report virus scan results and access the virus maps and any number of computers may be used to report virus scan results and view the virus map and associated data. The user computers 22, 24 may be a stand-alone desktop computer, laptop computer or a handheld device (e.g., personal digital assistant (PDA) or mobile phone), for example. The computers 22, 24 may be client computers coupled to an Internet service provider over a SLIP (Serial Line Interface Protocol) or PPP (Point to Point Protocol) connection. The Internet service provider is, in turn, coupled to the Internet, the client computer thereby having the ability to send and receive information to other nodes on the Internet using a TCP/IP protocol (Transmission Control Protocol/Internet Protocol).

Computer 24 includes or has access to a virus scanning application such as McAfee's VSHIELD, ACTIVESHIELD, SCAN NOW or VIRUSSCAN brand programs, or anti-virus applications described in U.S. Pat. No. 6,029,256, issued Feb. 22, 2000 or U.S. Pat. No. 6,035,423 issued Mar. 7, 2000, which are incorporated herein by reference in their entirety, or any other suitable anti-virus program. The virus scanning application preferably contains an update agent which is resident in the background of the computer system and polls for updates at a set interval. Update component versions may be posted on an application server provider (ASP) page located on the Internet, which reports back whether there are newer versions of any of the listed components. The virus scanning application may be installed on the user computer 24 by a disk or CD-ROM, or downloaded directly from the Internet, for example. The virus scanning application may also be accessed through an anti-virus web site that is configured to scan a remote computer without installing the virus scanning application locally. It is to be understood that the virus scanning may be performed on a system different than the one described herein without departing from the scope of the invention.

The results of the virus scans are sent from user computers 24 to system 20. The scan results may be collected at the same web server that is used to scan computer 24 or the computer may be configured to automatically report the results of the virus scanning if a local virus scan is performed. A user may, for example, subscribe to a program offered on an anti-virus web site that allows it to use its scanning software in return for use of data collected during virus scanning operations. The computer 24 may also perform a virus scan operation using an application installed on its hard drive and connect to the Internet and send a report containing the results of the scan after each virus scan operation or whenever the computer is in communication with the web site collecting the data.

The system 20 includes a plurality of data collection servers 28 and subscriber database servers 30. The data collection servers 28 are used to collect virus scan results sent from user computers 24. Posted reports containing the virus scan results are then stored in a publisher database 26. The database 26 is accessed by a publisher database server 34, which collects virus scan results and aggregates the data, as further described below. The aggregated data is replicated out to the subscriber database servers 30 for use by a virus map application. User computers 22 interact with the virus map through the subscriber database servers 30.

The servers 28, 30, 34 are conventional server type computers, preferably supporting a large number of multiple clients simultaneously for requests for data and other processing operations. The servers generally comprise a computer that is capable of sending and receiving information over the Internet, storing, retrieving, and maintaining files, and running various applications. The servers may have, for example, a packet-switched connection to the Internet. Communication between computers within the network is made possible with the use of communication protocols, which govern how computers exchange information over a network, as is well known by those skilled in the art.

It is to be understood that the computer network described above is only one example of a network that may utilize the system and method of the present invention. The computer network may be, for example, a stand-alone network (i.e., not coupled to the Internet) or an intranet.

Figure 2:
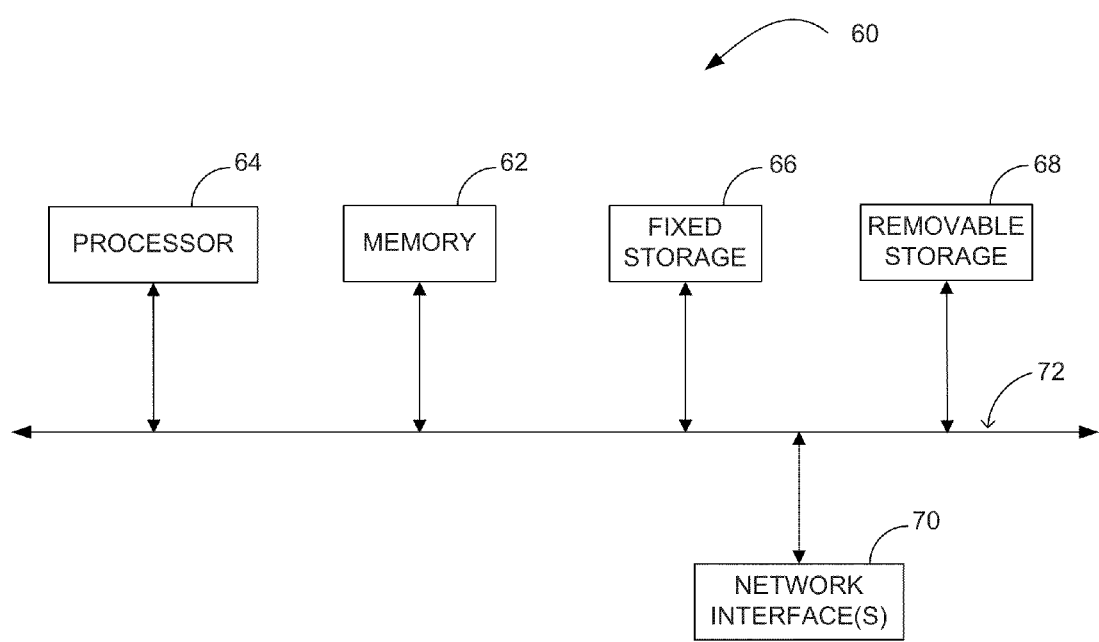
FIG. 2 is a block diagram of a computer system that can be utilized to execute software of an embodiment of the invention.

FIG. 2 shows a system block diagram of a computer system 60 that may be used as the user computer, server, or other computer system to execute software of an embodiment of the invention. The computer system 60 includes memory 62 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Additionally, a data signal embodied in a carrier wave (e.g., in a network including the Internet) may be the computer readable storage medium. Computer system 60 further includes subsystems such as a central processor 64, fixed storage 66 (e.g., hard drive), removable storage 68 (e.g., CD-ROM drive), and one or more network interfaces 70. Other computer systems suitable for use with the invention may include additional or fewer subsystems. For example, computer system 60 may include more than one processor 64 (i.e., a multi-processor system) or a cache memory. The computer system 60 may also include a display, keyboard, and mouse (not shown) for use as a desktop or laptop computer.

The system bus architecture of computer system 60 is represented by arrows 72 in FIG. 2. However, these arrows are only illustrative of one possible interconnection scheme serving to link the subsystems. For example, a local bus may be utilized to connect the central processor 64 to the system memory 62. Computer system 60 shown in FIG. 2 is only one example of a computer system suitable for use with the invention. Other computer architectures having different configurations of subsystems may also be utilized.

The publisher database server 34 includes an aggregation application configured to aggregate the virus scan results at scheduled intervals (e.g., less than one hour or less than thirty minutes). When the aggregation is complete a virus database (e.g., a one-row table) is updated with the 'last update date' and the data is replicated out to the subscriber servers 30 to create virus database within the subscriber server. The virus map application monitors this virus database, and when it changes, it invalidates all of the data layers of the virus map. When a user requests a data layer to view, the virus map application first checks to see if it is valid. If the data is invalid, it gets new data from the subscriber server database. This results in the data only being loaded for use by the virus map application when it is needed. Once loaded, it is cached until it becomes invalid.

A replication program, such as MICROSOFT REPLICATION, is used to allow for continuous updates of the subscriber server databases without interruption of access to the maps. The data collection servers 28 preferably receive input from the virus scanners on a continuous basis from a large number (e.g., millions) of user computers 24. The virus scan results are preferably provided to the publisher database 26 as 'inserts only' to avoid problems with updating and locking existing rows in the database. This allows the publisher database 26 to receive inserts, aggregate data, and replicate the data out to the subscriber servers 30. Since the subscriber servers 30 are only reading the data and not updating the data, there may be as many subscriber servers as necessary to support a given load, and the servers can be taken down as necessary for maintenance. Preferably, only the minimum amount of data is replicated from the publisher database 26 to the subscriber database servers 30.

The subscriber servers 30 use the information received from the publisher server 34 to provide virus reports to user computers 22 via the Internet. The virus report may be in the form of a virus map showing locations of viruses and tables providing detailed statistics from the virus scan results. The virus map may display, for example, number of viruses broken down by continent, country, or state (within the United States), a list of the top ten viruses, or grand totals for all viruses, as further described below with respect to FIGS. 8-12. In order to collect, store, and publish this data, the database 26 includes the following tables:

Virus_Reports: Contains scan results received by the data collection servers.

Grand_Totals: Contains grand totals for all viruses worldwide for each time period.

Totals_by_country: Contains virus totals for every country for each time period.

Totals_by_state: Contains virus totals for every state for each time period.

Forever_Totals: Contains cumulative totals for all data received at the data collection servers.

Viruses_by_country: Contains total number of specific viruses in every country for each time period.

Viruses_by_continent: Contains total number of specific viruses in every continent for each time period.

Viruses_by_state: Contains total number of specific viruses in every state for each time period.

TopTen24h: Contains a list of the top ten viruses by number of infected files for the last 24 hours.

TopTen7d: Contains a list of the top ten viruses by number of infected files for the last 7 days.

TopTen30d Contains a list of the top ten viruses by number of infected files for the last 30 days.

TopTenComp24h: Contains a list of the top ten viruses by number of infected computers for the last 24 hours.

TopTenComp7d: Contains a list of the top ten viruses by number of infected computers for the last 7 days.

TopTenComp30d: Contains a list of the top ten viruses by number of infected computers for the last 30 days.

TopTen24hCont: Contains a list of the top ten viruses by number of infected files and continent for the last 24 hours.

TopTen7dCont: Contains a list of the top ten viruses by number of infected files and continent for the last 7 days.

TopTen30dCont: Contains a list of the top ten viruses by number of infected files and continent for the last 30 days.

TopTenComp24hCont: Contains a list of the top ten viruses by number of infected computers and continent for the last 24 hours.

TopTenComp30dCont: Contains a list of the top ten viruses by number of infected computers and continent for the last 30 days.

TopTenComp7dCont: Contains a list of the top ten viruses by number of infected computers and continent for the last 7 days.

Top_Viruses_by_continent: Contains a list of the top ten viruses that appear in each continent.

Top_Viruses_by_country: Contains a list of the top ten viruses that appear in each country.

Top_Viruses_by_state: Contains a list of the top ten viruses that appear in each state.

It is to be understood that the above tables and the associated process description and user interface that follows are only examples of ways to present the data collected by the system and method of the present invention. The data may be presented, for example, in different groupings or formats or for different time periods, without departing from the scope of the invention.

Figure 3:
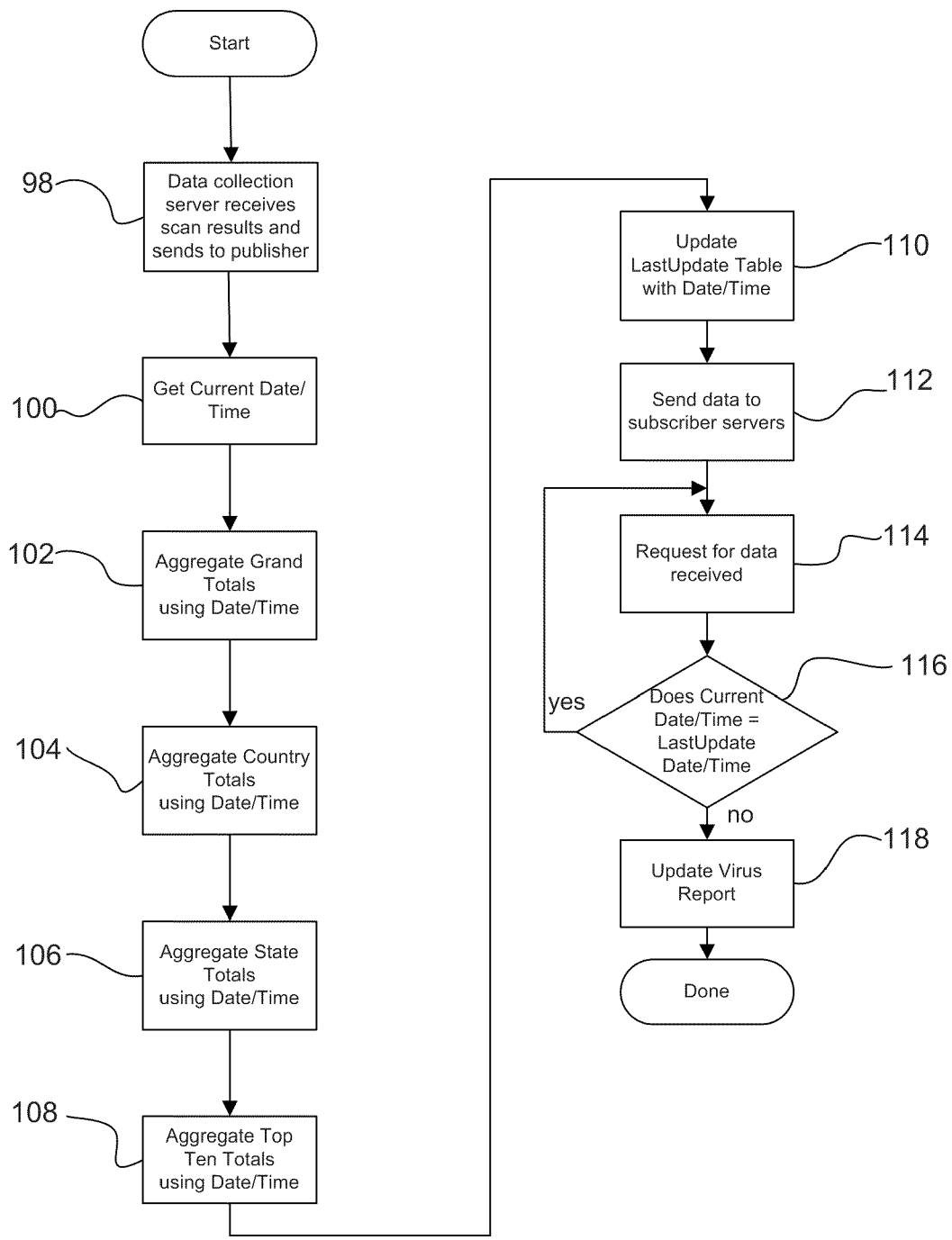
FIG. 3 is a flowchart illustrating a process of the present invention for collecting virus scan results and creating a virus map for tracking computer viruses.

FIG. 3 illustrates a process for collecting, aggregating, and distributing virus report data for use by the virus map. At step 98, the data collection servers 28 receive virus scan results from computers 24 and send this data to the publisher database 26. At step 100 the publisher server 34 gets the Current Date/Time. It then aggregates a grand total for all viruses at step 102 using the Current Date/Time (e.g., goes back 30 days from current date and time to get data for 30 day tables). The grand total includes the total number of all viruses identified from the virus scanning results received at the data collection servers 28 for a specified time period. At step 104, country totals are aggregated. The country totals include the total number of viruses identified within each country. The state totals, which include virus totals for each state within the United States, are aggregated at step 106. The top ten virus totals are aggregated at step 108. A LastUpdate table is then updated with the Current Date/Time at step 110. The publisher server 34 sends this data to the subscriber servers 30 which store the data in their databases (step 112). When one of the subscriber servers 30 receives a request for a virus map (step 114), it compares the date and time of the LastUpdate table and if it is different from the Current Date/Time it uses the new virus data to update the map (steps 116 and 118). FIGS. 4, 5, 6a, 6b, 7a, 7b, 7c, and 7d illustrate additional details of the process shown in FIG. 3.

Figure 4:
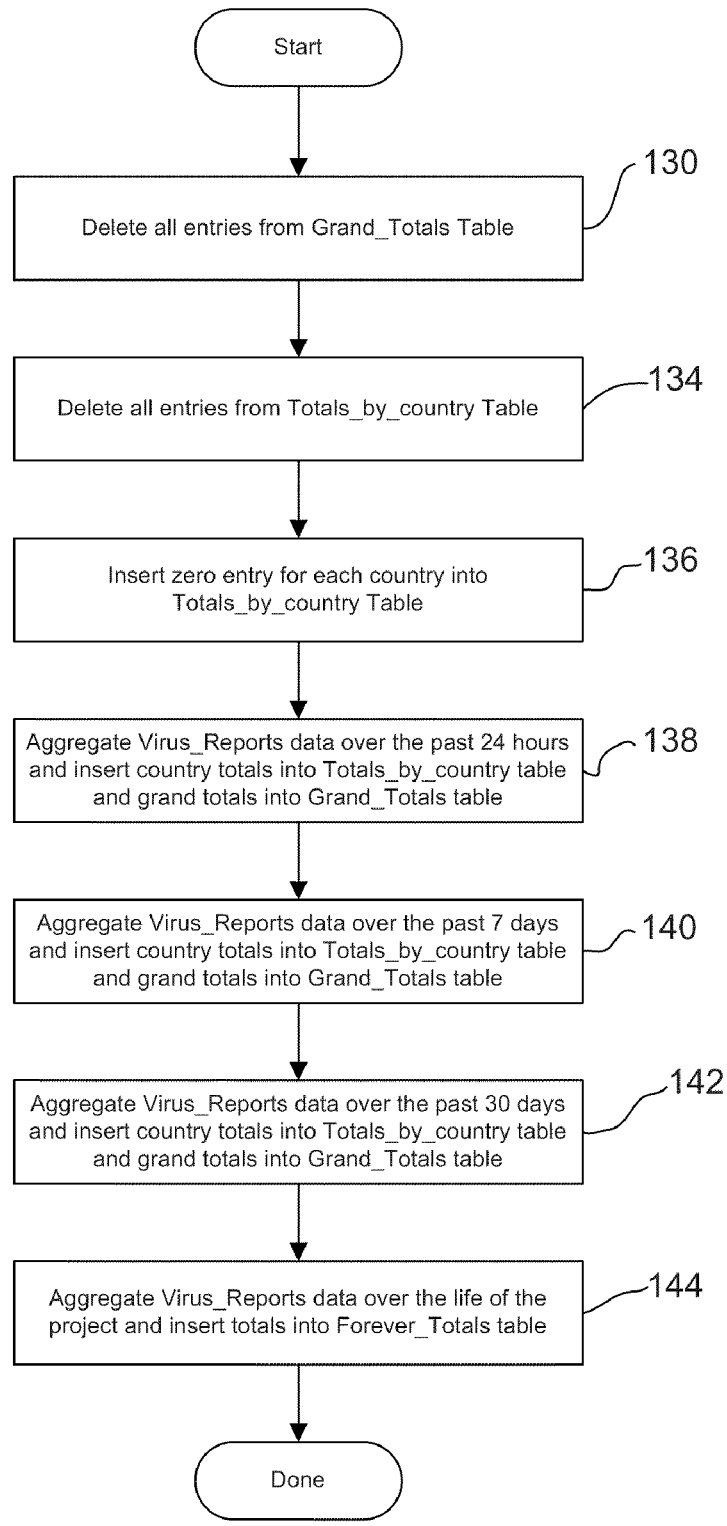
FIG. 4 is a flowchart illustrating a process for aggregating virus scan results to create grand total virus reports.

FIG. 4 describes a process for aggregating grand totals. All entries from the Grand_Totals table and Totals_by_country table are first deleted (steps 130 and 134). A zero entry is inserted for each country into Totals_by_country table (step 136). The Virus_Reports data is then aggregated over the past 24 hours, country totals are inserted into Totals_by_country table, and grand totals are inserted into Grand_Totals table (step 138). Next, the Virus_Reports data is aggregated over the past 7 days and the country totals are inserted into Totals_by_country table and the grand totals are inserted into Grand_Totals table (step 140). This step is repeated for Virus_Reports data collected over the past 30 days (step 142). The Virus_Reports data is then aggregated over the life of the project and totals are inserted into the Forever_Totals table at step 144.

Figure 5:
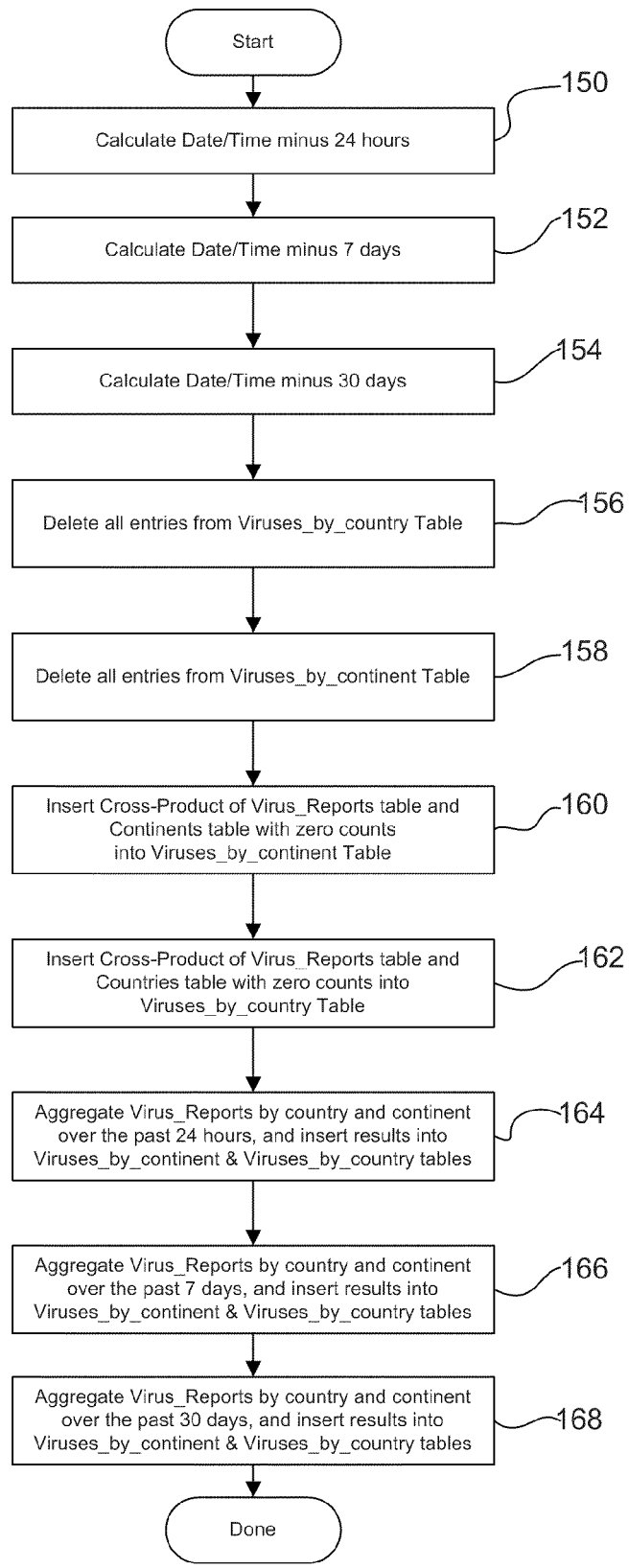
FIG. 5 is a flowchart illustrating a process for aggregating virus scan results by country.

FIG. 5 illustrates details of the process for aggregating scan results by country. At step 150 a date and time are calculated by subtracting 24 hours from the Current Date/Time. This is also done to calculate a new date and time by subtracting 7 days from the Current Date/Time and a new date time by subtracting 30 days from the Current Date/Time (steps 152 and 154). Next, all entries from the Viruses_by_country table and Viruses_by_continent table are deleted (steps 156 and 158). A cross product of the Virus_Reports table and Continents table is inserted with zero counts into Viruses_by_continent table at step 160. A cross product of the Virus_Reports table and Countries table is then inserted with zero counts into the Viruses_by_country Table (step 162). The Virus_Reports table is aggregated by country and continent over the past 24 hours, 7 days, and 30 days, and the results are inserted into the Viruses_by_continent and Viruses_by_country tables (steps 164, 166, and 168).

Figure 6A:
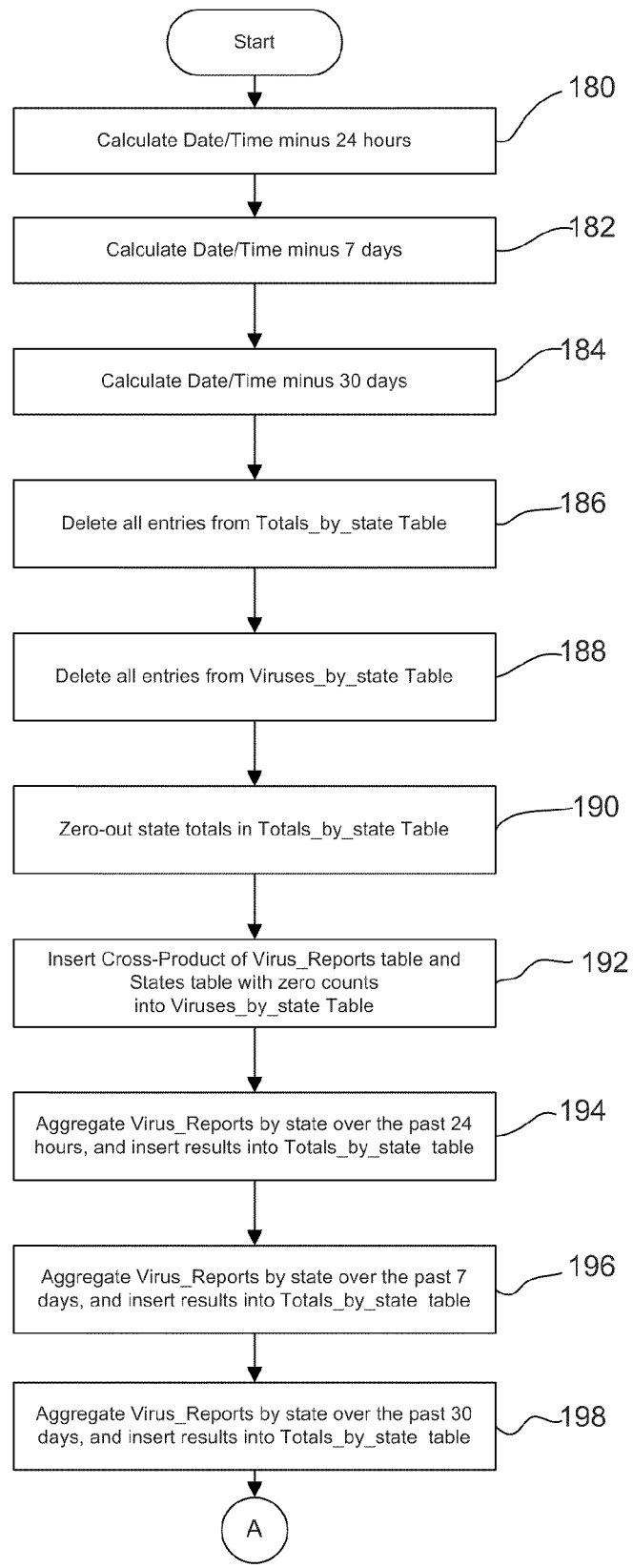
FIGS. 6a and 6b are flowcharts illustrating a process for aggregating virus scan results by state.
Figure 6B:
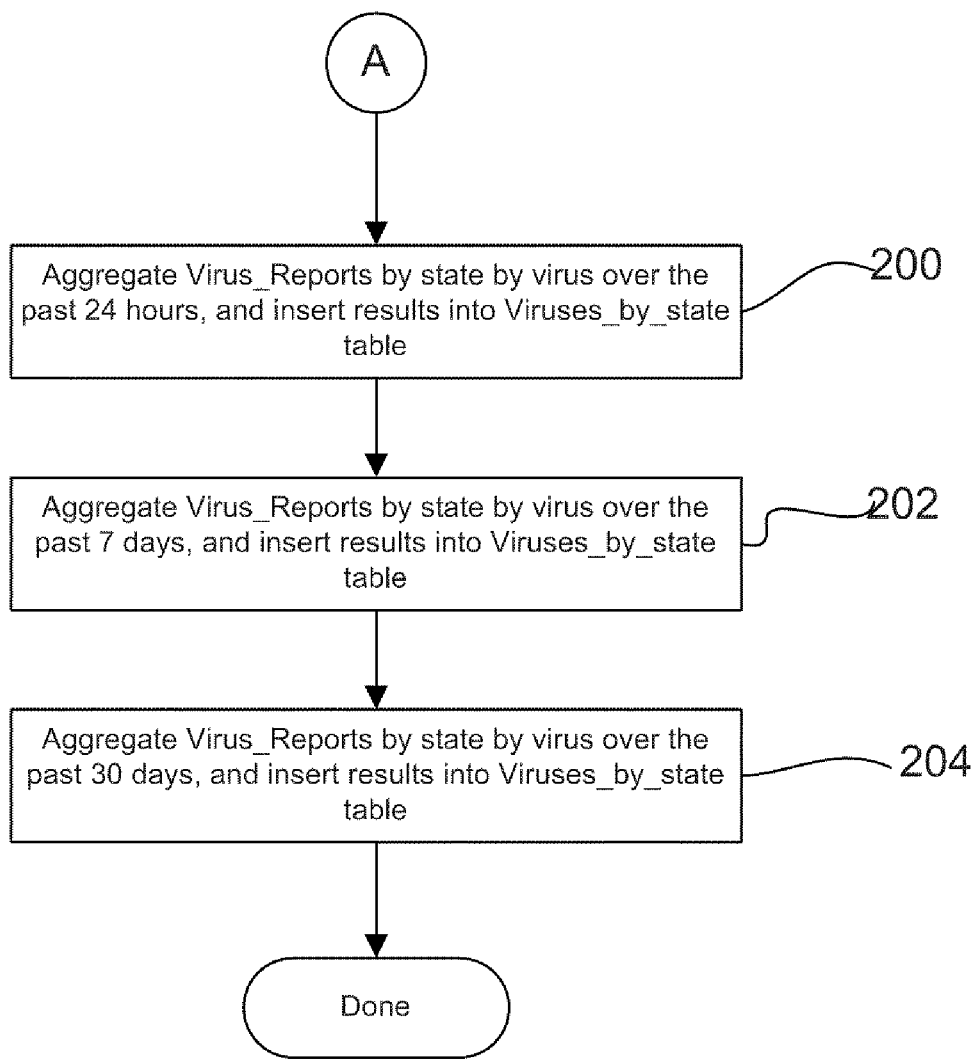
Figure 7A:
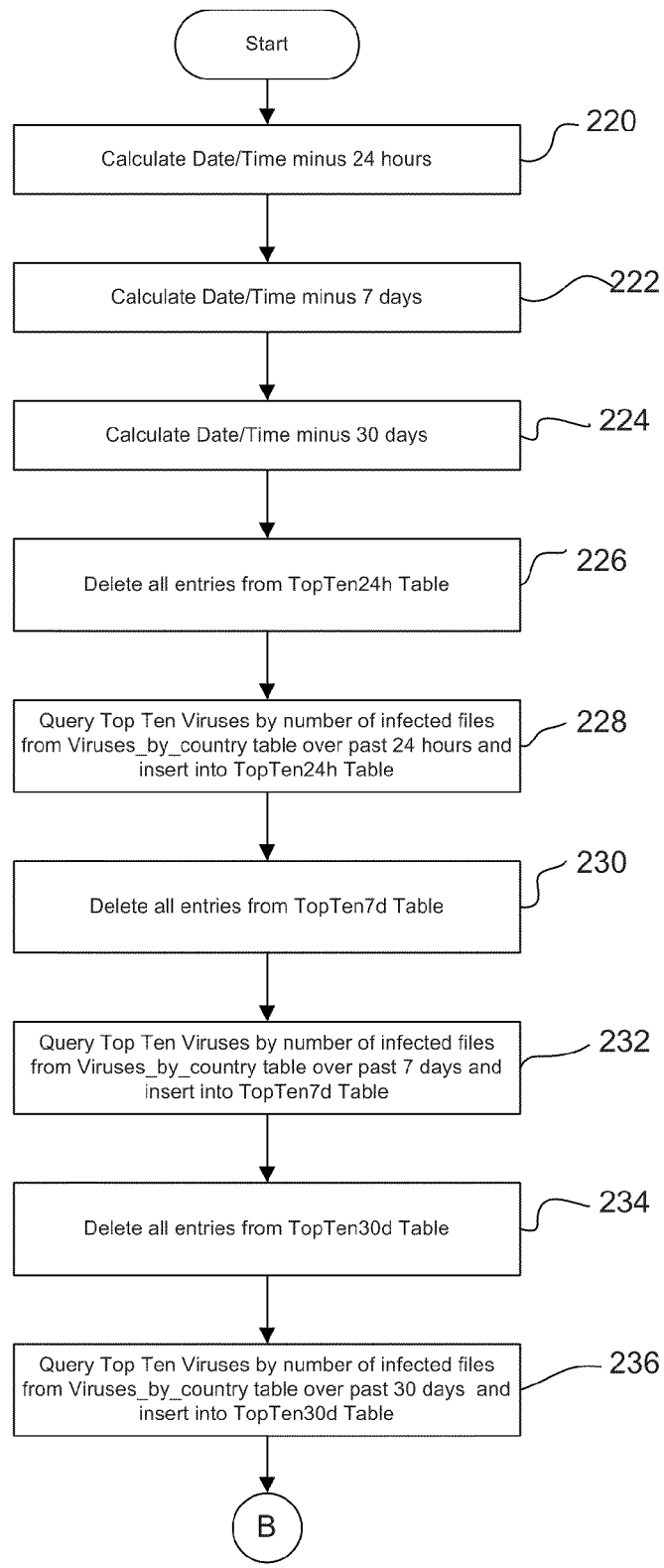
FIGS. 7a, 7b, 7c, and 7d are flowcharts illustrating a process for aggregating virus scan results to create top ten virus reports.
Figure 7B:
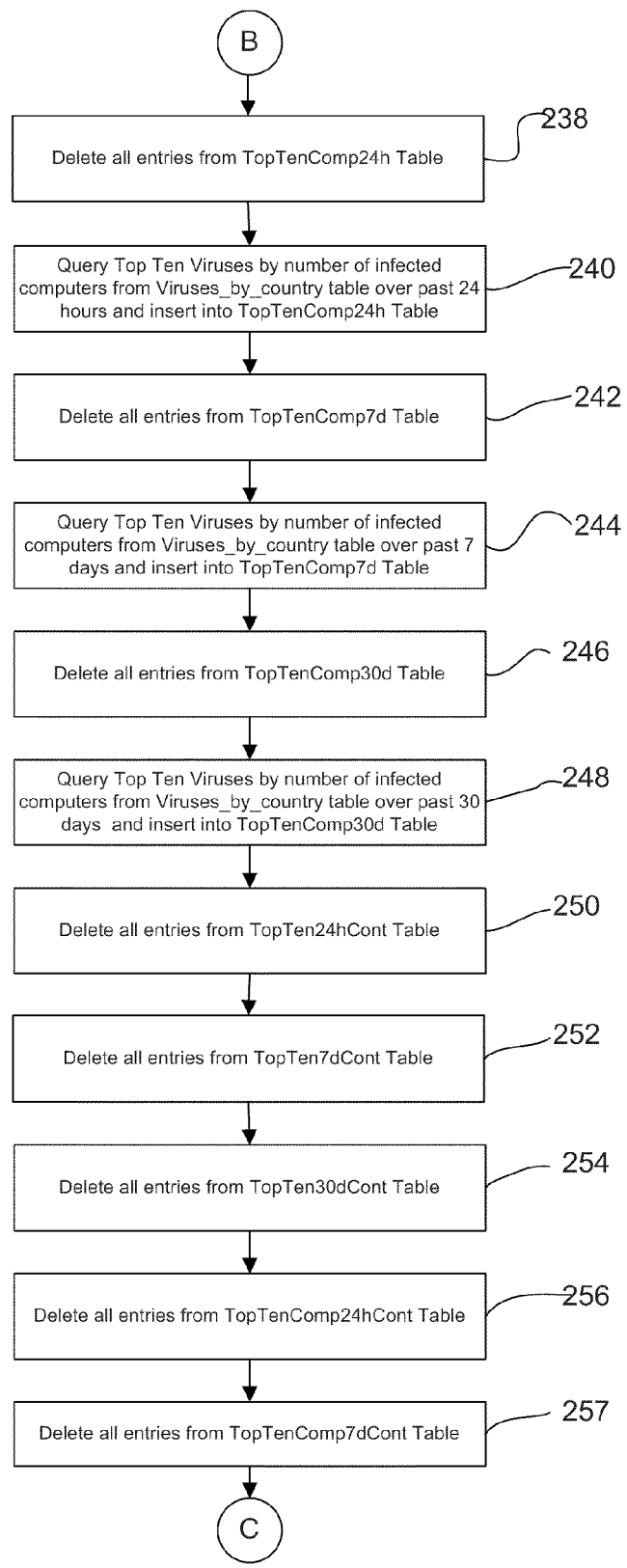
Figure 7C:
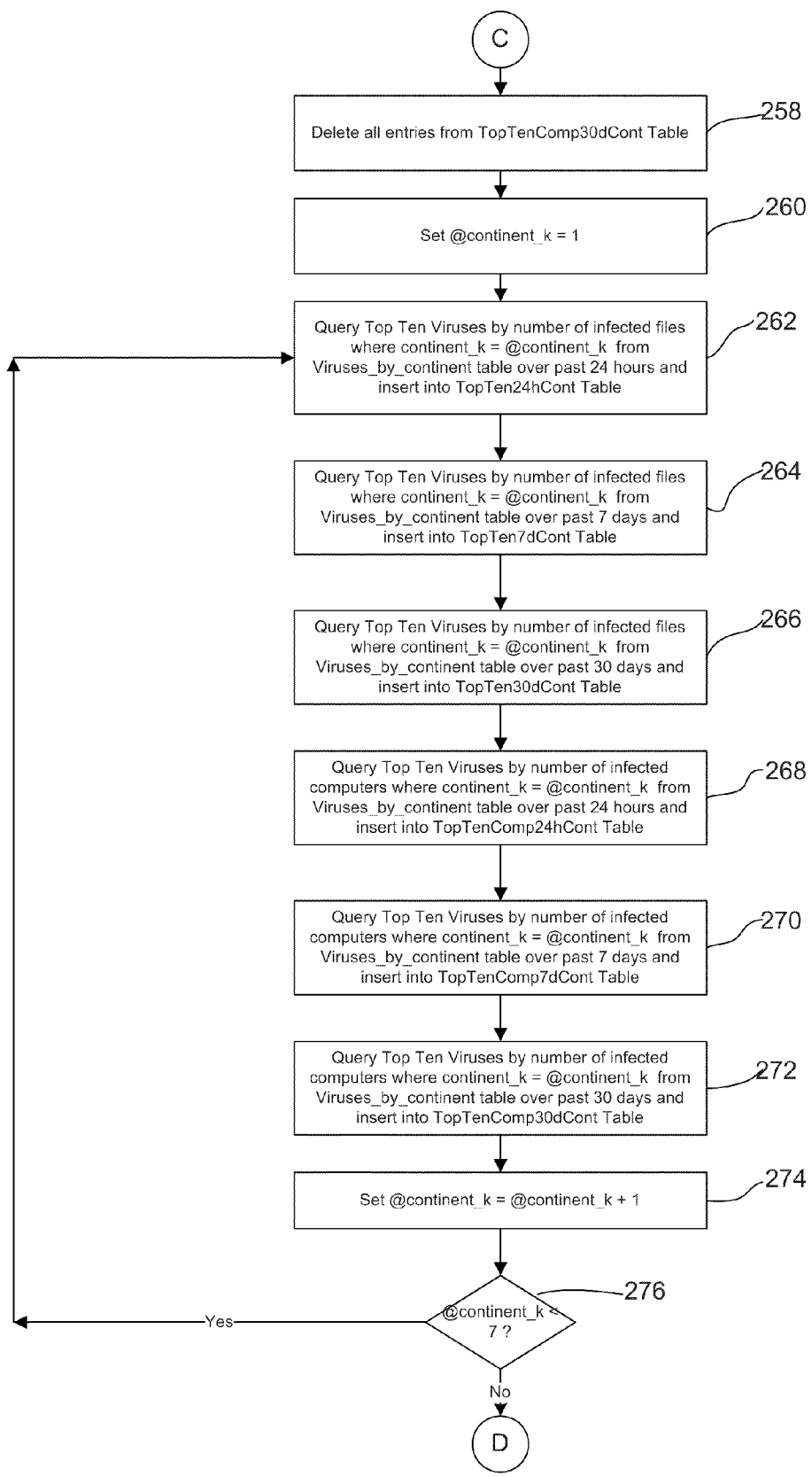
Figure 7D:
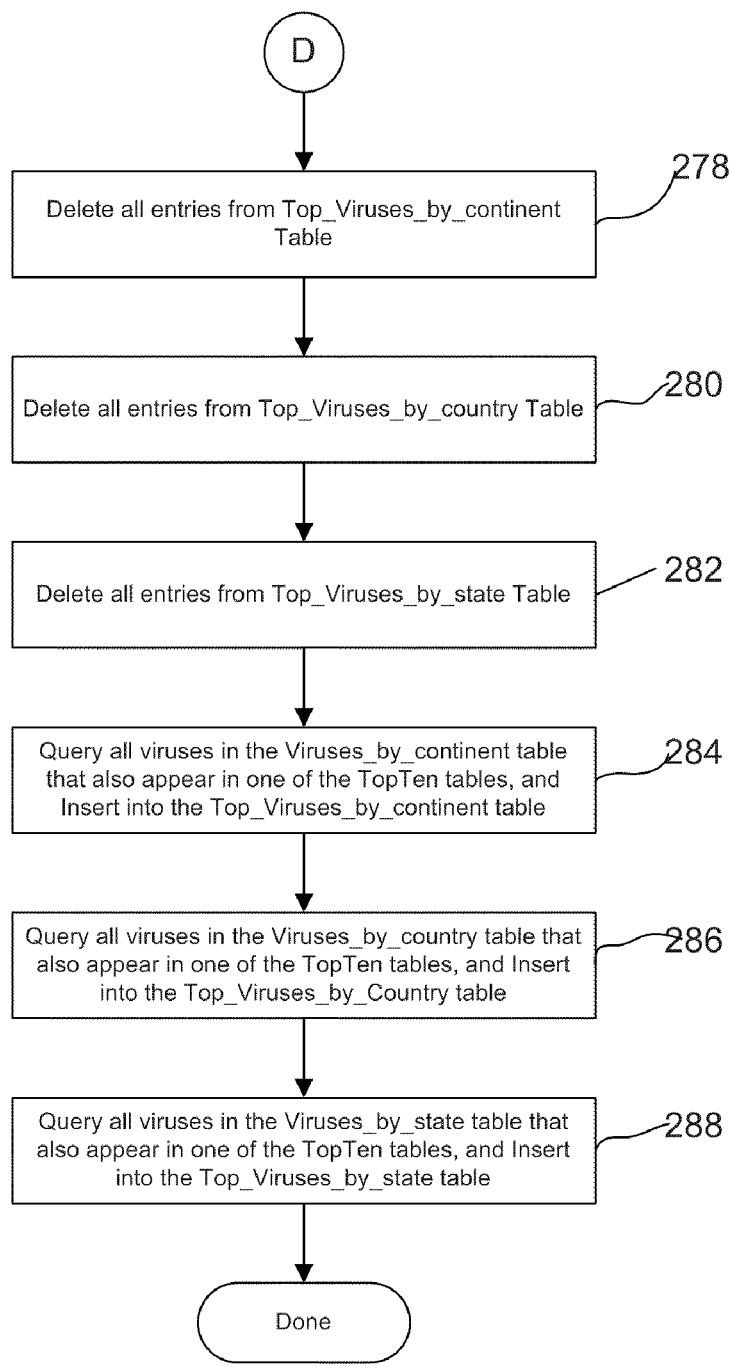

FIGS. 6a and 6b illustrate a state aggregation process. The date and time for the 24 hours, 7 days and 30 days reports are calculated at steps 180, 182, and 184. All entries are deleted from Totals_by_state table and the Viruses_by_state table (steps 186 and 188). The state totals in Totals_by_state table are zeroed-out at step 190. The cross product of the Virus_Reports table and States table is inserted into the Viruses_by_state Table with zero counts (step 192). The Virus_Reports are then aggregated by state over the past 24 hours, 7 days, and 30 days, and the results inserted into the Totals_by_state table (steps 194, 196, 198). The Virus_Reports are also aggregated by state and virus over the past 24 hours, 7 days, and 30 days, and the results inserted into Viruses_by_state table (steps 200, 202, and 204).

A process for aggregating top ten virus totals is shown in FIGS. 7a, 7b, 7c, and 7d. The date and time are first calculated for the 24 hour, 7 day and 30 day time periods at steps 220, 222, and 224. All entries are deleted from the TopTen24h table at step 226. The top ten viruses are queried by number of infected files from Viruses_by_country table over the past 24 hours and inserted into the TopTen24h table (step 228). At step 230, all entries from the TopTen7d table are deleted. The top ten viruses are then queried by number of infected filed from Viruses_by_country table over the past 7 days and inserted into the TopTen7d table (step 232). This process is then repeated for the TopTen30d table at steps 234 and 236. Next, all entries are deleted from the TopTenComp24h table at step 238. The application queries the top ten Viruses by number of infected computers from Viruses_by_country table over the past 24 hours and the results are inserted into the TopTenComp24h table (step 240). This process is repeated for the TopTenComp7d table and the TopTenComp30d table (steps 242, 244, 246, and 248). Next, all entries from the TopTen24hCont, TopTen7dCont, and TopTen30dCont are deleted (steps 250, 253, and 254) along with all entries from TopTenComp24hCont, TopTenComp7dCont, and TopTenComp30dCont, tables (steps 256, 257, and 258).

A variable @continent_k is set equal to 1 at step 260. At step 262 the top ten viruses are queried by the number of infected files wherein continent_k=@continent_k from Viruses_by_continent table over the past 24 hours. The results are inserted into the TopTen24hCont table. This is repeated for the past 7 days and past 30 days at steps 264 and 266. The top ten viruses are then queried by number of infected computers where continent_k=@continent_k from Viruses_by_continent table over the past 24 hours and the result inserted into the TopTenComp24h table (step 268). This step is repeated for the past 7 days and past 30 days at steps 270 and 272. At step 274 @continent_k is set equal to @continent_k+1 and steps 262 through 274 are repeated for as long as @continent_k<7 (step 276). All entries from the Top_Viruses_by_continent, Top_Viruses_by_country, and Top_Viruses_by_state are then deleted (steps 278, 280, and 282). All viruses in the Viruses_by_continent table that also appear in the TopTen tables are queried and the results are inserted into the Top_Viruses_by_continent table (step 284). This step is repeated for the Viruses_by_country and Viruses_by_state tables (steps 286 and 288).

Figure 8:
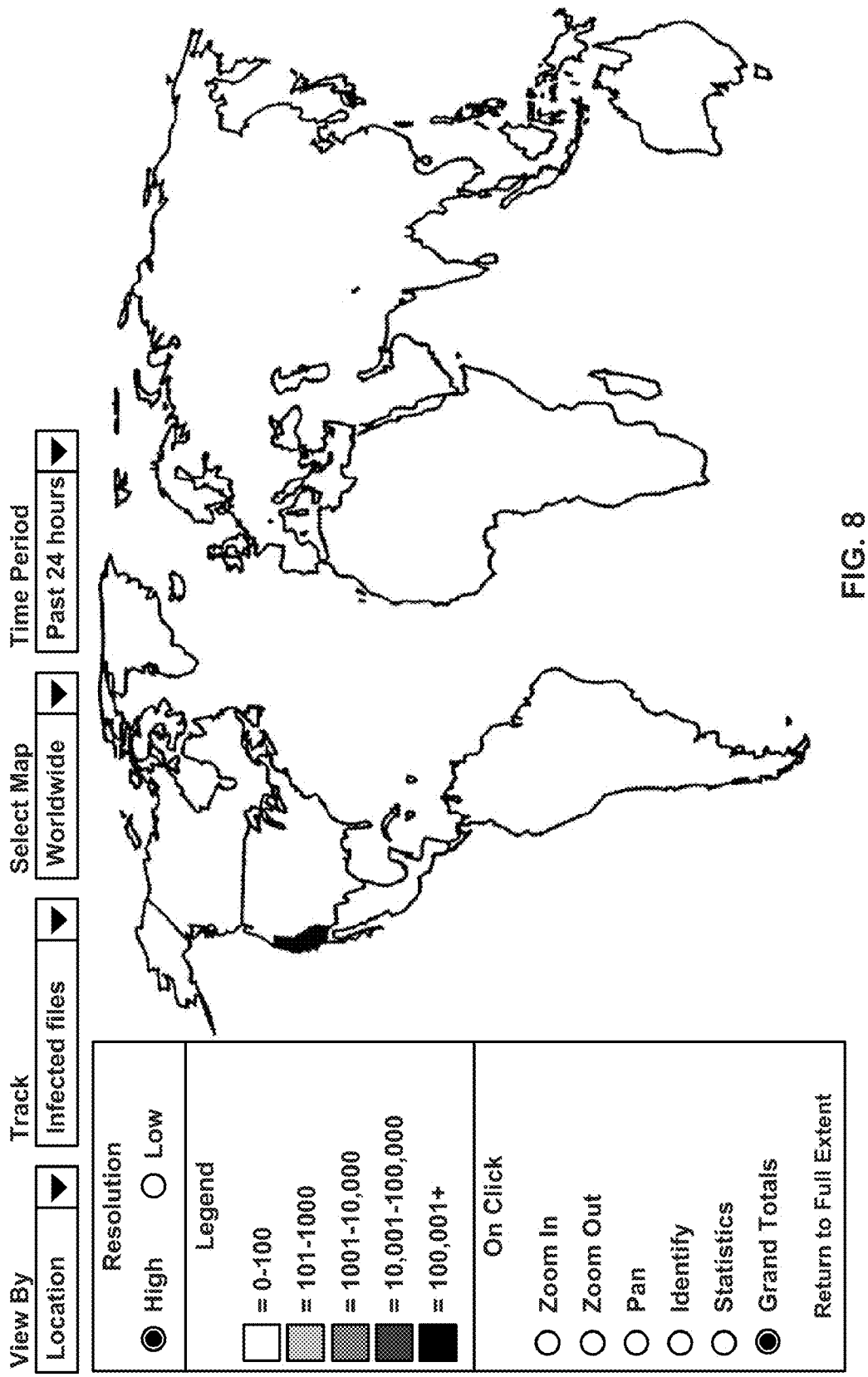
FIG. 8 is a screen view of a worldwide virus map and associated pull down menus and option boxes.
Figure 9:
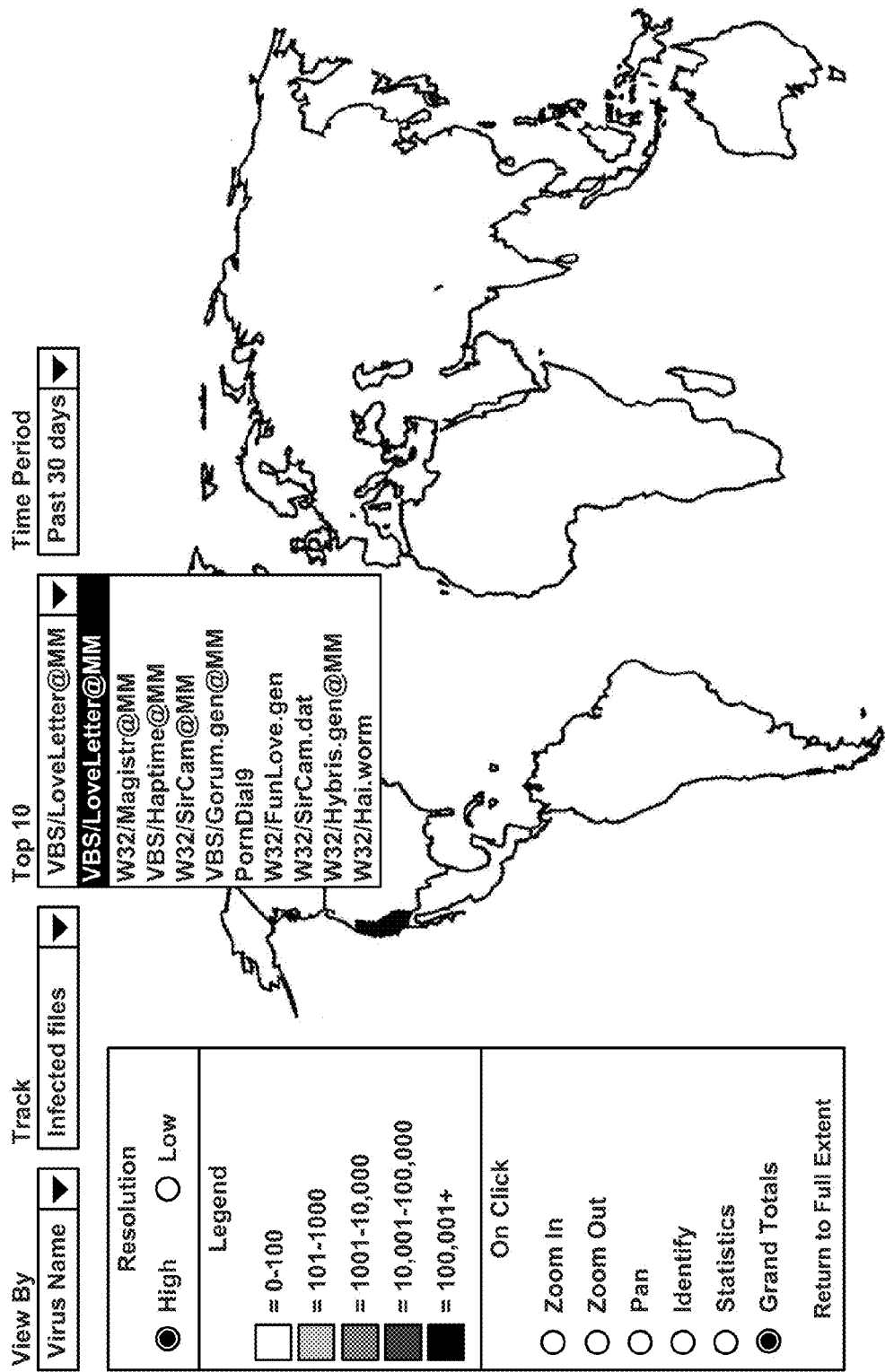
FIG. 9 is a screen view of a virus map listing the top ten viruses in a pull down menu.

The virus map may include, for example, statistics for 165 countries and be configured for interactive use (e.g., allow a user to zoom in or pan out on specific geographic areas, or point to and click on a specific country in the map and have statistics pop-up). Data is preferably collected 24 hours a day, seven days a week. The data may be aggregated every twenty minutes, for example, to provide near real time data on the relative prevalence of viruses worldwide. Examples of screen views of a virus map are shown in FIGS. 8 and 9. FIG. 8 shows a world map and pull down menus that allow a user to view by location or virus name, track infected files or infected computers, select map, and time period (e.g., 24 hours, 7 days, or 30 days). The screen further includes an option box that allows a user to select resolution (high or low), zoom in or out on specific areas of the map, pan the map, identify statistics for a specific area (e.g., click on Mexico and see "Mexico: 267 Infected Files"), provide statistics for top ten viruses and grand totals for all viruses. The legend identifies different colors associated with the number of infected files or infected computers found in a specific area. For example, California is shaded on the map to show that between 1001 and 10,000 infected files were identified for that state. The map is preferably divided into countries and the United States divided into states so that in addition to breaking the data down by continent, it can be further broken down by country or state (within the United States). FIG. 9 shows a view with the select map pull down menu replaced with a top ten list of viruses.

When a user selects Grand Totals from the option box, tables providing detailed virus reports may appear on the screen (FIGS. 10, 11 and 12). The table of FIG. 10 lists the worldwide grand totals for infected files and infected computers within the past 24 hours, 7 days, and 30 days. The table of FIG. 11 lists the worldwide grand totals for infected computers. These tables also include the associated number of scanned files or scanned computers so that the user can determine the percentage of files or computers that were infected. If the user selects statistics from the option box, a table such as shown in FIG. 12, appears on the screen. The table lists the top ten viruses found during scanning and the number of infected files found for each virus along with the associated number of files scanned. As discussed above, the virus reports may be presented in formats different than the virus map shown in FIGS. 8 and 9 and tables shown in FIGS. 10, 11, and 12, without departing from the scope of the invention.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A computer-implemented method for collecting and distributing data on computer viruses, comprising:
    collecting results of an examination performed by a virus scanning application from a plurality of devices on a computer network, wherein the virus scanning application is installed and executed locally on each of the plurality of devices to identify malicious content and report the results of the examination to a first server on the computer network;
    aggregating the results of the examination performed on the plurality of devices to create a results database at the first server, wherein the results database includes a geographical location for each of the plurality of devices; and
    creating a results report at a second server based on the results database.

2. The method of claim 1, wherein the results report includes a map.

3. The method of claim 2, wherein the map includes a view by location option.

4. The method of claim 2, wherein the map includes a view by virus name option.

5. The method of claim 2, wherein the map is color coded to identify the number of a particular type of malicious code at a geographical location.

6. The method of claim 1, wherein the results report on the second server can be accessed over a computer network.

7. The method of claim 1, wherein the results report is interactive.

8. The method of claim 7, wherein a user can filter the results report based on at least one of number of infected devices in the past 24 hours, number of infected devices in the past 7 days, and number of infected devices in the past 30 days.

9. The method of claim 1, wherein the results report indicates the number of devices scanned and the number of devices containing malicious content.

10. The method of claim 1, wherein the results of the examination performed on the plurality of devices are aggregated at a scheduled time interval.

11. The method of claim 1, wherein the computer network is the Internet.

12. The method of claim 1, wherein the results report contains the top ten viruses for a geographic location.

13. A computer program storage device, embodied on a tangible computer readable medium, comprising:
   computer code for causing a computer processor to collect results of an examination performed by a virus scanning application from a plurality of devices on a computer network, wherein the virus scanning application is installed and executed locally on each of the plurality of devices to identify malicious content and report the results of the examination to a first server on the computer network;
   computer code for causing a computer processor to aggregate the results of the examination performed on the plurality of devices to create a results database at the first server, wherein the results database includes a geographical location for each of the plurality of devices; and
   computer code for causing a computer processor to create a results report at a second server based on the results database.

14. The computer program storage device of claim 13, wherein the results report includes a map.

15. The computer program storage device of claim 14, wherein the map is color coded to identify the number of a particular type of malicious code at a geographical location.

16. A system, comprising:
   a memory; and
   a processor operatively coupled to the memory, the processor adapted to execute program code stored in the memory to:
      collect results of an examination performed by a virus scanning application from a plurality of devices on a computer network, wherein the virus scanning application is installed and executed locally on each of the plurality of devices to identify malicious content and report the results of the examination to a first server on the computer network;
      aggregate the results of the examination performed on the plurality of devices to create a results database at the first server, wherein the results database includes a geographical location for each of the plurality of devices; and
      create a results report at a second server based on the results database.

17. The system of claim 16, wherein the results report is interactive.

18. The system of claim 16, wherein the results report contains the top ten viruses for a geographic location.

19. The system of claim 16, wherein the results report includes a map.

20. The system of claim 19, wherein the map is color coded to identify the number of a particular type of malicious code at a geographical location.

* * * * *